US010092835B2

(12) United States Patent
Ladd et al.

(10) Patent No.: US 10,092,835 B2
(45) Date of Patent: Oct. 9, 2018

(54) SYSTEMS AND METHODS FOR SENSOR-BASED MOBILE GAMING

(71) Applicant: LyteShot Inc., Chicago, IL (US)

(72) Inventors: Mark J. Ladd, Chicago, IL (US); David M. Brooks, Chicago, IL (US)

(\*) Notice: Subject to any disclaimer, the term of this patent is extended or adjusted under 35 U.S.C. 154(b) by 0 days.

(21) Appl. No.: 15/203,653

(22) Filed: Jul. 6, 2016

(65) Prior Publication Data
US 2016/0310846 A1 Oct. 27, 2016

Related U.S. Application Data

(63) Continuation of application No. 14/247,199, filed on Apr. 7, 2014.

(60) Provisional application No. 61/809,057, filed on Apr. 5, 2013.

(51) Int. Cl.
| | |
|---|---|
| A63F 13/12 | (2006.01) |
| A63F 13/355 | (2014.01) |
| A63F 13/837 | (2014.01) |
| A63F 13/327 | (2014.01) |
| A63F 13/79 | (2014.01) |
| A63F 13/46 | (2014.01) |
| A63F 13/537 | (2014.01) |

(52) U.S. Cl.
CPC .......... *A63F 13/355* (2014.09); *A63F 13/327* (2014.09); *A63F 13/46* (2014.09); *A63F 13/537* (2014.09); *A63F 13/79* (2014.09); *A63F 13/837* (2014.09); *A63F 2300/5546* (2013.01)

(58) Field of Classification Search
CPC .......... A63F 13/12; A63F 2300/5546
USPC .............................. 463/29, 40–42
See application file for complete search history.

(56) References Cited

U.S. PATENT DOCUMENTS

| | | | |
|---|---|---|---|
| 8,317,615 | B2 | 11/2012 | Takeda et al. |
| 8,371,944 | B2 | 2/2013 | Kelly et al. |
| 8,469,824 | B1 | 6/2013 | Farley et al. |
| 2005/0026697 | A1 | 2/2005 | Balahura et al. |
| 2006/0223635 | A1 | 10/2006 | Rosenberg |
| 2008/0280684 | A1 | 11/2008 | McBride et al. |
| 2009/0017910 | A1 | 1/2009 | Rofougaran et al. |
| 2011/0159959 | A1 | 6/2011 | Mallinson et al. |
| 2011/0190061 | A1 | 8/2011 | Takeda et al. |

(Continued)

OTHER PUBLICATIONS

International Application No. PCT/US2014/033229, International Search Report and Written Opinion dated Aug. 28, 2014.

*Primary Examiner* — David L Lewis
*Assistant Examiner* — Shauna-Kay Hall
(74) *Attorney, Agent, or Firm* — Sheppard, Mullin, Richter & Hampton LLP

(57) ABSTRACT

A system includes an emitter, a receiver, a wireless communications module, and a user interface module. The emitter, controlled by a first player, emits an emitter signal that includes emitter identification information. The receiver receives the emitter signal and generates a receiver signal that includes the emitter identification information. The gameplay cloud interface module receives the receiver signal and communicates an indication that includes player identification information associated the emitter identification information. The gameplay cloud interface module is further configured to receive scoring information that is based on the player identification information. The user interface module presents gameplay information based on the scoring information to the first player.

20 Claims, 12 Drawing Sheets

(56) References Cited

U.S. PATENT DOCUMENTS

| | | |
|---|---|---|
| 2012/0106042 A1 | 5/2012 | Ashida et al. |
| 2012/0122570 A1 | 5/2012 | Baronoff |
| 2012/0142415 A1 | 6/2012 | Lindsay |
| 2012/0196684 A1 | 8/2012 | Richardson |
| 2012/0243732 A1 | 9/2012 | Swaminathan et al. |
| 2013/0225288 A1 | 8/2013 | Levin et al. |
| 2014/0287806 A1* | 9/2014 | Balachandreswaran ............... A63F 13/00 463/7 |

* cited by examiner

SYSTEMS AND METHODS FOR SENSOR-BASED MOBILE GAMING

CLAIM OF PRIORITY

The present application is a continuation application of U.S. patent application Ser. No. 14/247,199, filed Apr. 7, 2014, entitled, "Systems and Methods for Sensor-Based Mobile Gaming," to Mark Ladd et al., which in turn claims priority under 35 U.S.C. § 119(e) to provisional U.S. Patent Application Ser. No. 61/809,057, filed Apr. 5, 2013 and entitled "Systems, Apparatuses and Methods Associated with Interactive Gaming," the contents of both of which are hereby incorporated by reference herein.

TECHNICAL FIELD

The technical field relates to systems and methods for gaming on digital devices. More particularly, the technical field relates to systems and methods for sensor-based gaming on mobile devices.

BACKGROUND

Electronic games have long provided many forms of entertainment and information across a variety of genres and across many easily-accessible platforms. For example, electronic games involving adventure genres, first-person shooting genres, automotive or aviation genres, role-playing of fantasy genres, sports genres, and collaborative social genres have allowed players to challenge themselves and other players. By providing interactive elements with which players achieve in-game objectives, many electronic games provide exciting arenas for players to compete or collaborate.

SUMMARY

A system includes an emitter, a receiver, a wireless communications module, and a user interface module. The emitter, controlled by a first player, emits an emitter signal that includes emitter identification information. The receiver receives the emitter signal and generates a receiver signal that includes the emitter identification information. The gameplay cloud interface module receives the receiver signal and communicates an indication that includes player identification information associated the emitter identification information. The gameplay cloud interface module is further configured to receive scoring information that is based on the player identification information. The user interface module presents gameplay information based on the scoring information to the first player.

In various embodiments, the emitter identification information may comprise the player identification information. The receiver may be controlled by a second player. In various embodiments, a pairing module may be configured to pair a mobile device comprising the gameplay cloud interface module to one or more of the emitter and the receiver.

One or more of the emitter and the receiver may be incorporated into a modular peripheral device. The emitter may be incorporated into one or more of a gun, a sword, a grenade, a bow, and a wand. The emitter signal may comprise one or more of an infrared signal and an Near Field Communications (NFC) signal. The gameplay cloud interface module may support an Internet connection to the server. The gameplay cloud interface module may be incorporated into one or more of a mobile phone, a tablet computing device, and a heads-up-display (HUD).

In a method, an emitter signal may be emitted from an emitter, the emitter being controlled by a first player, the emitter signal including emitter identification information. A receiver may receive the emitter signal. The receiver may generate a receiver including the emitter identification information. A gameplay cloud interface module may receive the receiver signal. An indication may be communicated to a server with the gameplay cloud interface module, in response to the receiver signal, the indication including player identification information associated the emitter identification information. Scoring information generated by the server may be received using the gameplay cloud interface module, the scoring information based on the player identification information. The gameplay information may be presented based on the scoring information to the first player.

In various embodiments, the emitter identification information may comprise the player identification information. The receiver may be controlled by a second player. In some embodiments, the gameplay cloud interface module may be paired to one or more of the emitter and the receiver.

One or more of the emitter and the receiver may be incorporated into a modular peripheral device. The emitter may be incorporated into one or more of a gun, a sword, a grenade, a bow, and a wand. The emitter signal may comprise one or more of an infrared signal and an Near Field Communications (NFC) signal. The gameplay cloud interface module may support an Internet connection to the server. The gameplay cloud interface module may be incorporated into one or more of a mobile phone, a tablet computing device, and a heads-up-display (HUD). In embodiments, the gameplay information may comprise one or more of a gameplay level, gameplay points, and a gameplay life of the first player.

A system may comprise: means for emitting an emitter signal, the emitter being controlled by a first player, the emitter signal including emitter identification information; means for receiving the emitter signal and for generating a receiver signal, the receiver signal including the emitter identification information; means for: receiving the receiver signal, communicating an indication to a server, in response to the receiver signal, the indication including player identification information associated the emitter identification information, and receiving scoring information generated by the server, the scoring information based on the player identification information; and means for presenting gameplay information based on the scoring information to the first player.

Other features and embodiments are apparent from the accompanying drawings and from the following detailed description.

DETAILED DESCRIPTION

Most electronic games do not effectively interface with the physical world. People may benefit from electronic games that allow them to interact with the physical world. In various embodiments, a sensor-based mobile gaming system allows players to interface with the physical world while engaging in gameplay. Attributes conventionally associated with console-based gaming and social gaming may be fused together with data from peripheral devices, such as emitters and/or receivers having sensors. Real-world actions are modeled as in-game actions that form portions of interactive gameplay. Emitters and/or receivers are coupled to a particular player's communications device, which is controlled with a cloud-based gameplay system. For example, in combat gameplay, a player may fire infrared signals from an emitter at another player's receiver. The communications device may provide, with information and feedback from the gameplay server, players with hits, misses, or other aspects of gameplay.

Figure 1:
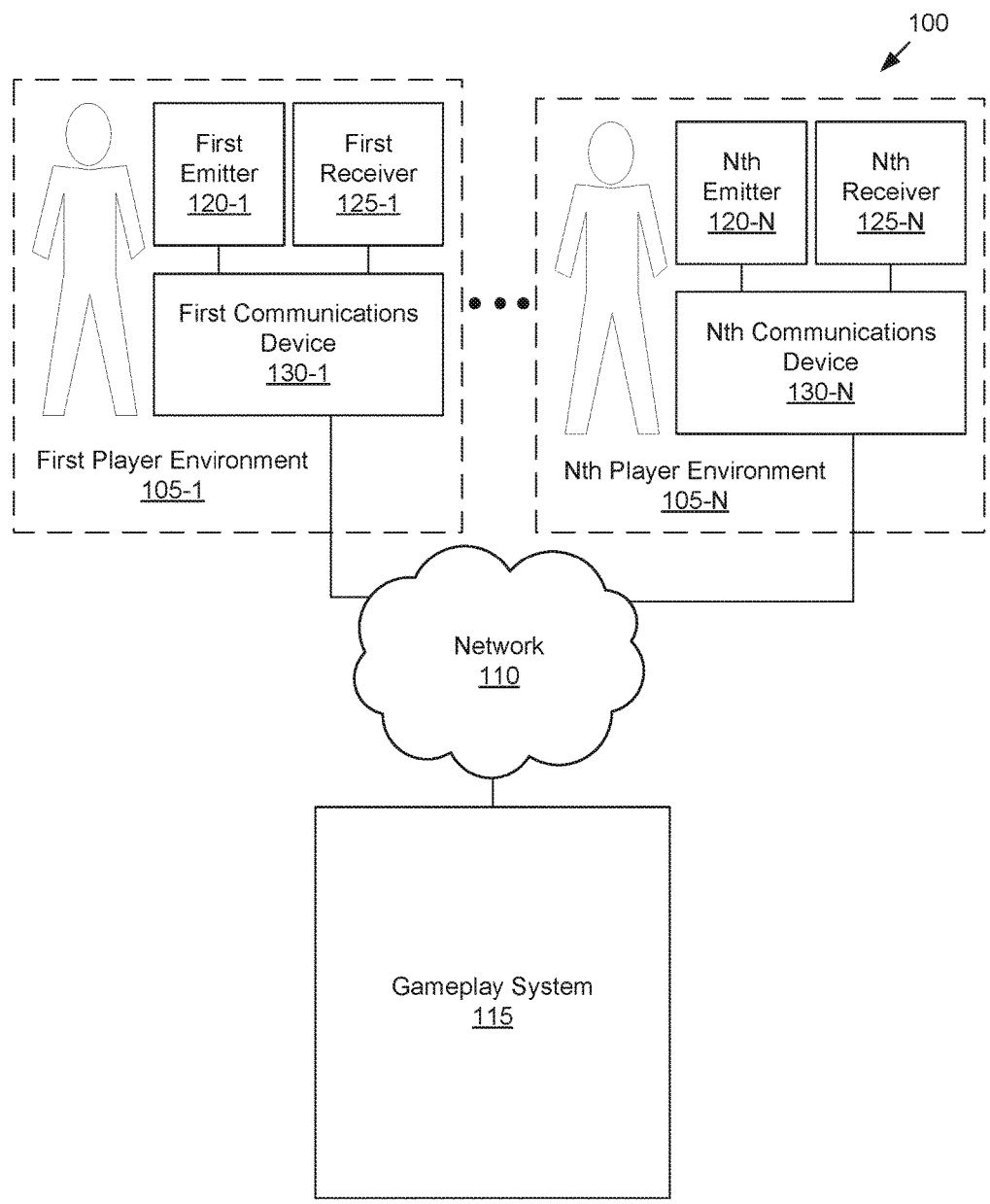
FIG. 1 depicts an example of a sensor-based mobile gaming system, according to some embodiments.

FIG. 1 depicts an example of a sensor-based mobile gaming system 100, according to some embodiments. The sensor-based mobile gaming system 100 includes a plurality of player environments 105 (illustrated in FIG. 1 as a first player environment 105-1 through an Nth player environment 105-N), a network 110, and a gameplay system 115.

The first player environment 105-1 comprises a set of devices associated with a first player of the sensor-based electronic game. The first player environment 105-1 comprises a first emitter 120-1, a first receiver 125-1, and a first communications device 130-1. The first emitter 120-1 and the first receiver 125-1 may be coupled to the first communications device 130-1 using any known or convenient format. In some embodiments, the first emitter 120-1 and the first receiver 125-1 may be coupled to the first communications device 130-1 using a Bluetooth® connection (e.g., a Bluetooth Low Energy® connection)) or other network connection. As discussed further herein, the first emitter 120-1, the first receiver 125-1, and the first communications device 130-1 may be used by a first player to engage in sensor-based electronic gameplay.

The first emitter 120-1 may comprise a digital device with a transmitter configured to emit an emitter signal, to a receiver. The emitter signal may comprise one of a variety of electromagnetic signals. In various embodiments, the emitter signal may include an infrared signal or a Near Field Communications (NFC) signal. The emitter signal may further comprise a beam that is directed at the receiver. The beam may be encoded with a unique identifier corresponding to the first emitter 120-1. The first emitter 120-1 may provide information related to the emitter signal to the first communications device 130-1. The first emitter 120-1 may be controlled by the first communications device 130-1. The first emitter 120-1 may be incorporated into a modular peripheral device, that is, a device that is provided using a hardware development kit. An example of a hardware development kit includes a set of plans that players can print on a three-dimensional (3D) printer using a template in the kit. In various embodiments, the first emitter 120-1 may have some or all of the components of the emitter 120, shown in FIG. 2.

In some embodiments, the first emitter 120-1 may take the form of a weapon used in sensor-based gameplay. For example, the first emitter 120-1 may be a gun, a bow, a sword, a wand, a grenade, or other weapon. The first emitter 120-1 may have a shoot mechanism that allows the first player to initiate an action. The shoot mechanism may instruct the transmitter of the first emitter 120-1 to emit the emitter signal. The shoot mechanism may have a variety of forms. For instance, in embodiments where the first emitter 120-1 comprises a gun, the shoot mechanism may appear as a finger-based trigger. When the finger-based trigger is activated, the first emitter 120-1 may emit the emitter signal. As another example, in embodiments where the first emitter 120-1 comprises a grenade, the shoot mechanism may appear as a grenade clip that instructs emission of the emitter signal after expiration of a specified time. It is noted the first emitter 120-1 need not have a shoot mechanism, and may emit the emitter signal upon occurrence of any number of specified events. It is further noted, in various embodiments, the first emitter 120-1 need not take the form of a weapon, and may instead take some other form. For instance, the first emitter 120-1 may take the form of a search device used in scavenger-hunting gameplay, in some embodiments. In particular embodiments, the first emitter 120-1 may be wearable. For example, the first emitter 120-1 may be integrated into a piece of clothing to be worn on a player.

Further, in some embodiments, the first emitter 120-1 may trigger data export to the first communications device 130-1 at various times, including: when the first emitter 120-1 is initially coupled to the first communications device 130-1, when a player has taken an action on the first emitter 120-1, and when the first emitter 120-1 is decoupled from the first communications device 130-1.

The first receiver 125-1 may comprise a digital device configured to receive an emitter signal. The first receiver 125-1 may receive the emitter signal from an emitter associated with another player (e.g., the Nth emitter 120-N). If the emitter signal is encoded with the identity of an emitter, the first receiver 125-1 may decode the emitter signal. The first receiver 125-1 may provide to the first communications device 130-1 a receiver signal corresponding to the received emitter signal. The first receiver 125-1 may be controlled by the first communications device 130-1. The first receiver 125-1 may be incorporated into a modular peripheral device. In various embodiments, the first receiver 125-1 may have some or all of the components of the receiver 125, shown in FIG. 3.

In particular embodiments, the first receiver 125-1 may have a form compatible with sensor-based gameplay. In gameplay where the first emitter 120-1 is configured as a gun, the first receiver 125-1 may be configured to receive a beam from the emitter 120-1. In gameplay where the first emitter 120-1 is configured as a sword, the first receiver 125-1 may be configured as a tunic or other wearable item configured to receive a touch by the first emitter 120-1, in one example. In gameplay where the first emitter 120-1 is configured as a grenade, the first receiver 125-1 may be configured to receive emitter signals from an approximate point source corresponding to the location of the first emitter 120-1. In gameplay where the first emitter 120-1 is configured for scavenger hunt games, the first receiver 125-1 may include an identifier, such as a Quick Response (QR) Code that facilitates access to items in gameplay. In combat-based gameplay embodiments, the first receiver 125-1 may provide such an identifier.

In various embodiments, the first receiver 125-1 may trigger data export to the first communications device 130-1 at various times, including: when the first receiver 125-1 is initially coupled to the first communications device 130-1, when the first receiver 125-1 has indicated some action (e.g., a valid hit) has been taken on the first receiver 125-, and when the first receiver 125-1 is decoupled from the first communications device 130-1.

The first communications device 130-1 may be configured to provide the first player with sensor-based gameplay based on information from the first emitter 120-1 and/or the first receiver 125-1, and/or the gameplay system 115. More specifically, the first communications device 130-1 may receive emitter signals from the first emitter 120-1. The first communications device 130-1 may further receive the receiver signal from the first receiver 125-1. In various embodiments, the first communications device 130-1 may provide the first player with an application that presents sensor-based gameplay. The application may include data, services, and other information obtained from the gameplay system 115. The application may have been downloaded from an application store or installed using other methodologies. The application may support in-game purchases and/or in-game advertising. In various embodiments, through the use of geo-fencing, the application may give any venue (retail stores, restaurants, stadiums, movie theaters, etc.) the ability to run promotions, drive advertisement revenue, and encourage the social sharing of their brand to the player's game app on their phone.

Figure 4:
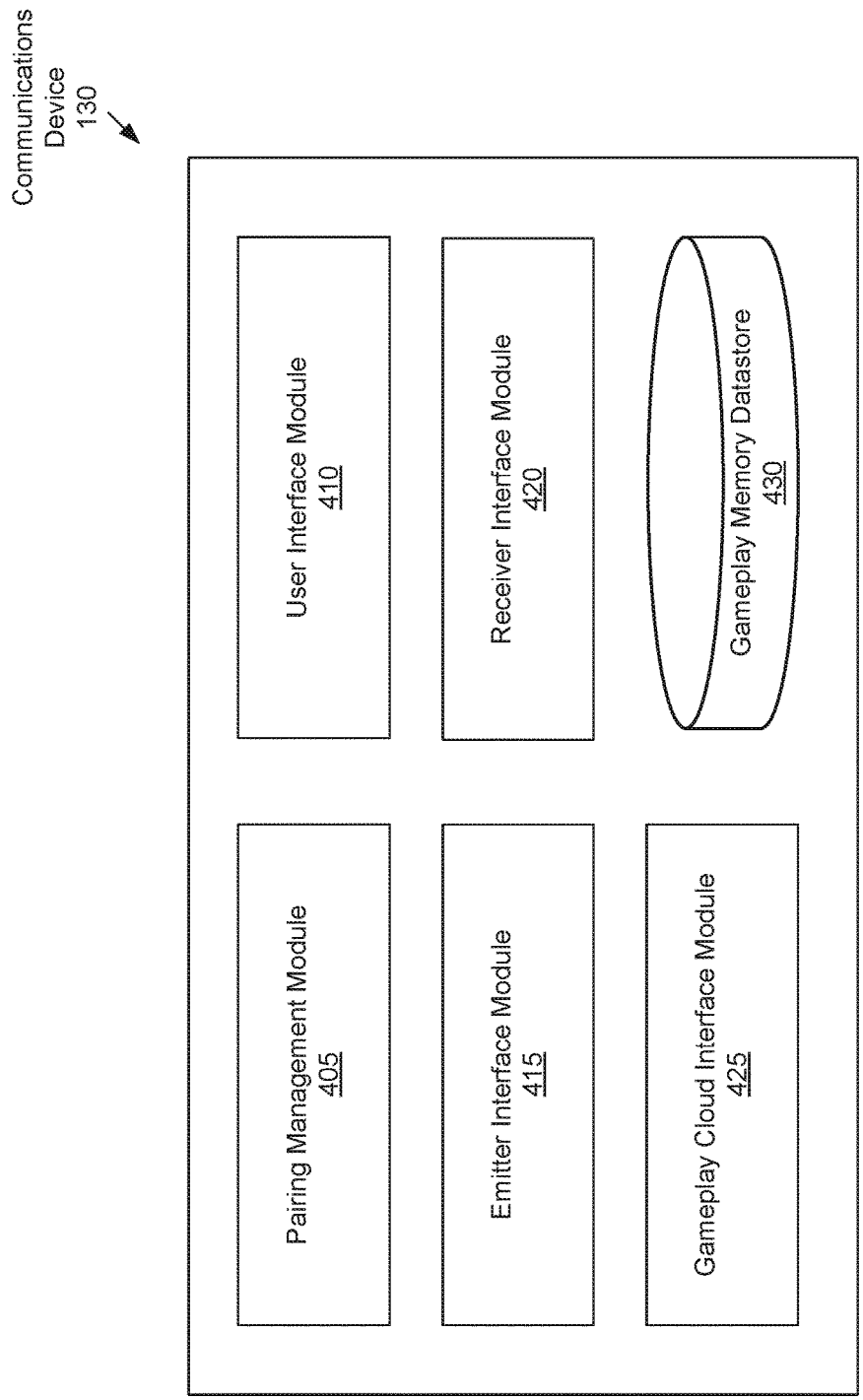
FIG. 4 depicts an example of a communications device, according to some embodiments.

In some embodiments, the first communications device 130-1 may have some or all of the components of the communications device 130, shown in FIG. 4. In embodiments, the first communications device 130-1 may have some or all of the components of the digital device 1000, shown in FIG. 10. In various embodiments, the first communications device 130-1 may be one or more of: a mobile phone, a tablet computing device, a heads up display (HUD), a desktop computer, a laptop computer, or other digital device.

In some embodiments, the first communications device 130-1 may not have access or limited access to the network 110 while gameplay is underway. For example, the first communications device 130-1 may not have access to a cellular or Wi-Fi network during sensor-based gameplay. In these embodiments, the first communications device 130-1 may cache or otherwise store data associated with the sensor-based gameplay and provide the data to the gameplay system 115 when there is connectivity or sufficient connectivity to the network 110.

Though FIG. 1 shows the first communications device 130-1 associated with a first player, it is noted, in various embodiments, the first communications device 130-1 need not be associated with a human being. Rather, in various embodiments, the first communications device 130-1 may be associated with and/or controlled by a digital device. The first communications device 130-1 may be controlled by an inanimate entity that, in turn receives instructions from the gameplay system 115. In such embodiments, the first emitter 120-1 and/or the first receiver 125-1 may be associated with the inanimate entity. Taking the example of a scavenger hunt game, the first receiver 125-1 may correspond to an inanimate object that is to be discovered as an object of gameplay.

The Nth player environment 105-N represents a set of devices associated with an Nth player of the sensor-based electronic game. It is noted the letter "N" represents an arbitrary number, and may correspond to any integer greater than 1. The Nth player environment 105-N comprises an Nth emitter 120-N, an Nth receiver 125-N, and an Nth communications device 130-N. In various embodiments, the Nth emitter 120-N may be similar to the first emitter 120-1, discussed herein. The Nth receiver 125-N may be similar to the first receiver 125-1, discussed herein. The Nth communications device 130-N may be similar to the first communications device 130-1. In various embodiments, the Nth receiver 125-N may receive an emitter signal from the first emitter 120-1. The Nth receiver 125-N may correspondingly provide a receiver signal to the Nth communications device 130-N.

The network 110 may comprise a computer network. The network 110 may include technologies such as Ethernet, 802.11x, worldwide interoperability for microwave access WiMAX, 2G, 3G, 4G, CDMA, GSM, LTE, digital subscriber line (DSL), and/or the like. The network 110 may further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or the like. The data exchanged over the network 110 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec). The network 110 may be coupled to the first communications device 130-1, to the Nth communications device 130-N, and to the gameplay system 115. In various embodiments, though not shown in FIG. 1, the network 110 may be coupled to one or more of the first emitter 120-1, the first receiver 125-1, the Nth emitter 120-N, and the Nth receiver 125-N.

The gameplay system 115 may support sensor-based gameplay by one or more of the first communications device 130-1 and the Nth communications device 130-N. In various embodiments, the gameplay system 115 may facilitate creation of new games, and/or may manage player accounts. The gameplay system 115 may also allow for the management of aspects of existing games. For instance, in some embodiments, the gameplay system 115 may track successful or unsuccessful actions by emitters associated with players. The gameplay system 115 may provide to communications devices whether an action by a particular emitter successfully registered at a particular receiver. In some embodiments, the gameplay system 115 may have some or all of the components of the gameplay system 115, shown in FIG. 5. In various embodiments, the gameplay system 115 may have some or all of the components of the digital device 1000, shown in FIG. 10.

In various embodiments, the elements of the sensor-based mobile gaming system 100 allow a player to play an active and/or outdoor sensor-based electronic game that is supported by the data available over the network 110 (e.g., over the Internet). The sensor-based electronic game may comprise forms of alternate reality gaming in which aspects of the physical world are incorporated into mobile gameplay. For instance, the sensor-based mobile gaming system 100 may support a combat game in which players use emitters to attempt in-game actions, and receivers to register successful in-game actions. The sensor-based mobile gaming system 100 may support augmented reality gaming, where aspects of the physical world are augmented by gameplay. The gaming experience provided by the sensor-based mobile gaming system 100 may provide new dimensions to outdoor games by leveraging smartphone technologies and the Internet, and bridging conventional gaming divides between the real world and digital worlds by combining physical participation, geolocational data, social networking data, and elements of games (such as action and/or role-playing games). The gameplay system 115 may also provide messaging and/or social media capabilities for players to communicate with each other. The sensor-based electronic game may be developed using a Game Development Kit (GDK).

By using emitters and receivers to register game actions, the sensor-based mobile gaming system 100 allows players to verify the actions of other players. Players need not wonder whether, for instance, the first emitter 120-1 accurately took an action with respect to the Nth receiver 125-N. More specifically, the sensor-based mobile gaming system 100 may allow users to use technologies such as geolocational technologies, infrared technologies, and data available over the network 110 to provide real-time feedback of gameplay between players.

In some embodiments, the sensor-based mobile gaming system 100 can provide geo-fencing capabilities to players. Geo-fencing may limit the areas the sensor-based electronic game can be played only at venues that can support particular games. Venues, such as retail stores, restaurants, and movie theaters may be supported in running promotions and encouraging the social sharing of their brands on mobile applications of players.

In various embodiments, the first emitter 120-1 may emit an emitter signal toward the Nth receiver 125-N each time the first player attempts to attack the Nth player. In various examples, the in-game actions may correspond to a gun being shot, a sword being swung, or a grenade being launched. Emitter signals from the first emitter 120-1 may be encoded with the identity of the first emitter 120-1. The first emitter 120-1 may provide the first communications device 130-1 with information about in-game action attempts. The first communications device 130-1 may provide this information to the gameplay system 115. Further, in these examples, the Nth receiver 125-N may register successful in-game actions each time the emitter signal successfully contacts the Nth receiver 125-N. For each successful in-game action, the Nth receiver 125-N may decode received emitter signals as needed. The Nth receiver 125-N may further provide information about successful in-game actions to the Nth communications device 130-N, which in turn may provide this information to the gameplay system 115. In these embodiments, the gameplay system 115 may provide information about the in-game actions, whether successful or not, to the first communications device 130-1 and the Nth communications device 130-N. The first communications device 130-1 and the Nth communications device 130-N may update user interface elements thereon accordingly.

FIG. 1 depicts a first emitter 120-1 through an Nth emitter 120-N, a first receiver 125-1 through an Nth receiver 125-N, and a first communications device 130-1 through an Nth communications device 130-N in order to illustrate various implications of multiple players of sensor-based mobile gameplay. However, it is noted portions of the discussion herein refer to an "emitter 120," a "receiver 125," and a "communications device 130" for simplicity.

Figure 2:
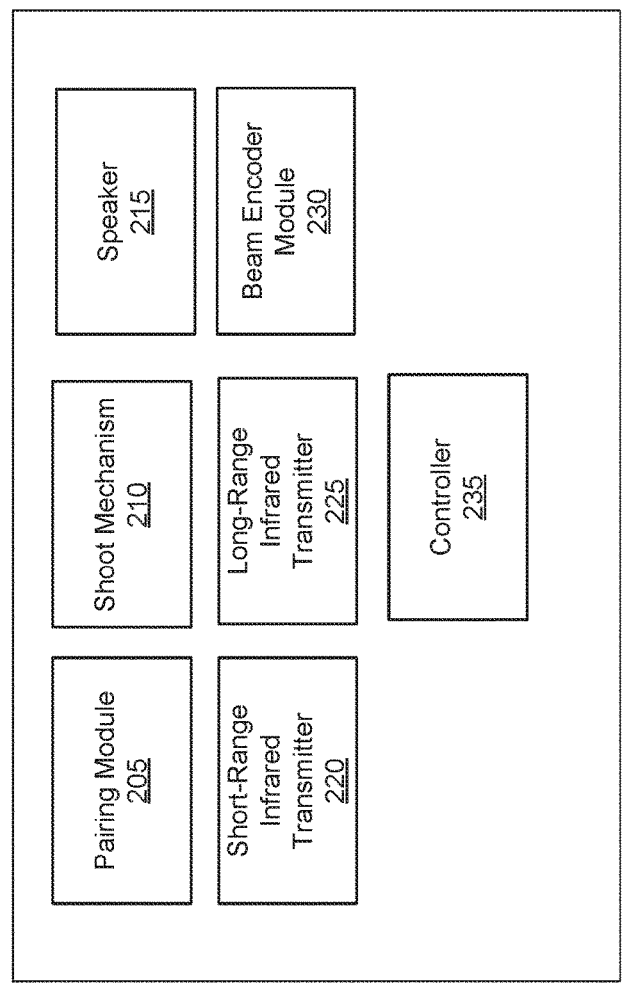
FIG. 2 depicts an example of a emitter, according to some embodiments.

FIG. 2 depicts an example of an emitter 120, according to some embodiments. The emitter 120 may include a pairing module 205, a shoot mechanism 210, a speaker 215, a short-range infrared transmitter 220, a long-range infrared transmitter 225, a beam encoder module 230, and a controller 235. The emitter 120 may include sensors and/or components not identified explicitly in FIG. 2.

The pairing module 205 may facilitate pairing between the emitter 120 and a communications device 130. In various embodiments, the pairing module 205 may be configured as a Bluetooth® pairing module that allows the emitter 120 to be wirelessly coupled to the communications device 130. The pairing module 205 may receive instructions from the controller 235.

The shoot mechanism 210 may allow a player to initiate an action. In some embodiments, the shoot mechanism 210 may correspond to a trigger of a gun. The shoot mechanism 210 may also correspond to a portion (e.g., a blade portion) of a sword or a grenade, depending on a type of weapon the emitter 120 is intended to model. The shoot mechanism 210 may also correspond to a portion of a metal detector for a scavenger-hunt game. The shoot mechanism 210 may provide a signal to the controller 235 when an action has been initiated.

The speaker 215 may provide an audible sound. In various embodiments, the speaker 215 may provide sounds related to sensor-based mobile gameplay when the shoot mechanism 210 has been activated. The sound may correspond to the nature of the action initiated. For instance, the speaker 215 may provide sounds similar to the shooting of a gun, the clash of a sword on armor, or the explosion of a grenade In various embodiments, the speaker 215 may provide in-game information such as in-game sounds, story narration, clues, and/or other information to enhance gameplay experiences. The speaker 215 may receive instructions from the controller 235.

The short-range infrared transmitter 220 and the long-range infrared transmitter 225 may each emit an infrared signal corresponding to an emitter signal. The short-range infrared transmitter 220 and the long-range infrared transmitter 225 may have different ranges, or may have partially overlapping ranges. The short-range infrared transmitter 220 and the long-range infrared transmitter 225 may provide infrared signals in response to the shoot mechanism 210. The short-range infrared transmitter 220 and the long-range infrared transmitter 225 may receive instructions from the controller 235. It is noted that one or more of the short-range infrared transmitter 220 and the long-range infrared transmitter 225 may be replaced or augmented by non-infrared technologies, such as other wireless technologies and/or NFC technologies, without departing from the scope and substance of the inventive concepts herein.

The beam encoder module 230 may encode emitter signals with an identifier corresponding to the identity of the emitter 120. In some embodiments, the beam encoder module 230 may receive a unique identifier of the emitter 120 from the controller 235. The beam encoder may further encode emitter signals with the unique identifier. Encoding may involve frequency selection frequency modulation of the emitter signal, or encoding particular sequences of data into the emitter signal from the emitter 120. The beam encoder module 230 may provide the code to the short-range infrared transmitter 220 and/or the long-range infrared transmitter 225.

The controller 235 may control other components of the emitter 120. The controller 235 may provide instructions to one or more of the pairing module 205, the shoot mechanism 210, the speaker 215, the short-range infrared transmitter 220, the long-range infrared transmitter 225, and the beam encoder module 230. In some embodiments, the controller 235 may include a processor and memory. The controller 235 may include a mobile device processor and static or dynamic memory.

A module may be hardware, software, or a combination of both.

Figure 3:
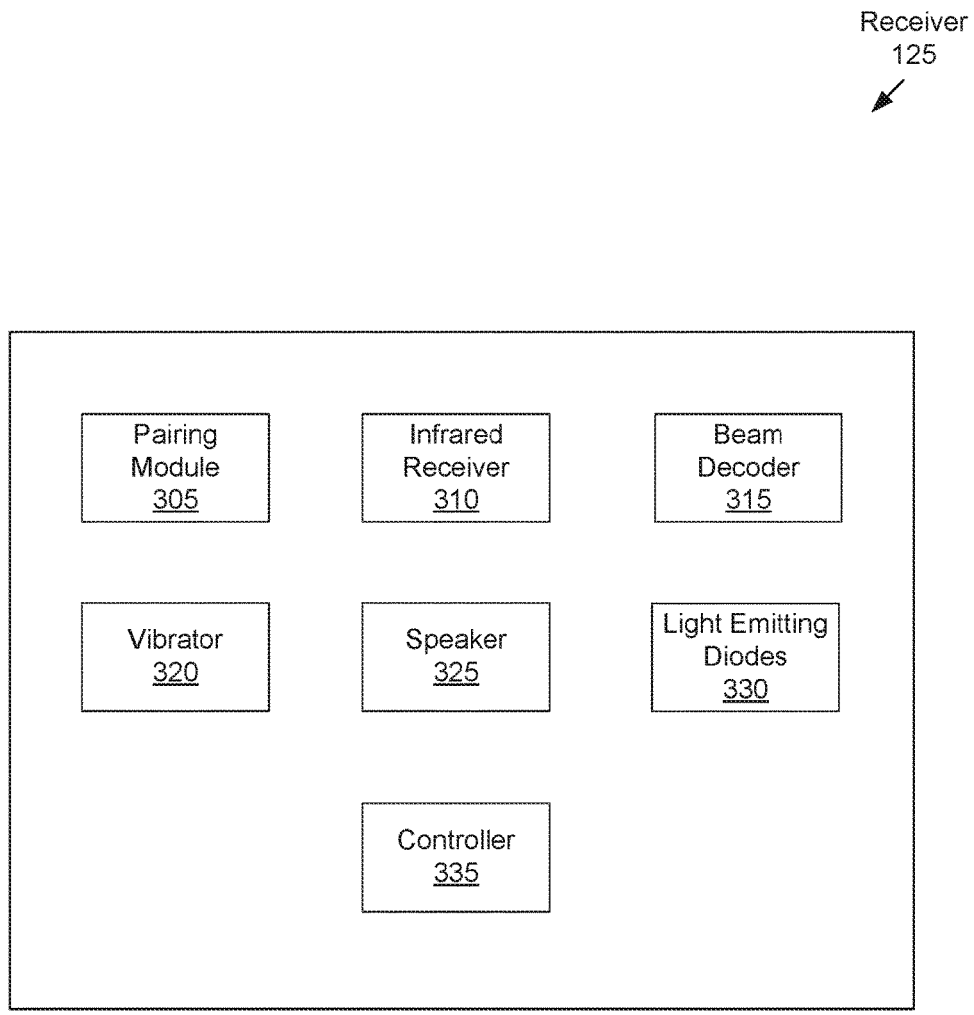
FIG. 3 depicts an example of a receiver, according to some embodiments.

FIG. 3 depicts an example of a receiver 125, according to some embodiments. The receiver 125 may include a pairing module 305, an infrared receiver 310, a beam decoder 315, a vibrator 320, a speaker 325, Light Emitting Diodes (LEDs) 330, and a controller 335. The receiver 125 may include sensors and/or components not identified explicitly in FIG. 3.

The pairing module 305 may facilitate pairing between the receiver 125 and a communications device 130. In embodiments, the pairing module 305 may be configured as a Bluetooth® pairing module that allows the receiver 125 to be wirelessly coupled to the communications device 130. The pairing module 305 may receive instructions from the controller 335.

The infrared receiver 310 may receive infrared signals. In various embodiments, the infrared receiver 310 may be implemented as an electromagnetic receiver that filters out frequencies other than infrared signals. It is noted the infrared receiver 310 may be replaced or augmented by non-infrared technologies, such as other wireless technologies and/or NFC technologies, without departing from the scope and substance of the inventive concepts herein. The infrared receiver 310 may provide received infrared signals to the beam decoder 315 and/or other modules of the receiver 125.

The beam decoder 315 may decode received emitter signals. More specifically, the beam decoder 315 may identify an emitter identifier encoded in emitter signals received by the infrared receiver 310. In various embodiments, the beam decoder 315 may receive instructions from the controller 335.

The vibrator 320 may cause the receiver 125 to physically move. The speaker 325 may make an audible noise. The LEDs 330 may cause all or a part of the receiver 125 to appear to light up. In various embodiments, the vibrator 320, the speaker 325, and the LEDs 330 may receive instructions from the controller 335 to be activated when the infrared receiver 310 has received an emitter signal that indicates a gameplay action by an emitter.

The controller 335 may control other components of the receiver 125. The controller 235 may provide instructions to one or more of the pairing module 305, the infrared receiver 310, the beam decoder 315, the vibrator 320, the speaker 325, and the Light Emitting Diodes (LEDs) 330. The controller 335 may include a processor (e.g., a mobile device processor) and memory (e.g., static or dynamic memory).

FIG. 4 depicts an example of a communications device 130, according to some embodiments. The communications device 130 may include a pairing management module 405, a user interface module 410, an emitter interface module 415, a receiver interface module 420, a gameplay cloud interface module 425, and a gameplay memory datastore 430. One or more of the pairing management module 405, the user interface module 410, the emitter interface module 415, the receiver interface module 420, the gameplay cloud interface module 425, and the gameplay memory datastore 430 may include hardware and/or software, in various embodiments. One or more of the pairing management module 405, the user interface module 410, the emitter interface module 415, the receiver interface module 420, the gameplay cloud interface module 425, and the gameplay memory datastore 430 may be coupled to one another or to components external to the communications device 130.

The pairing management module 405 may configure the communications device 130 to be paired with other devices. In various embodiments, the pairing management module 405 may include a Bluetooth® pairing module that facilitates wireless pairing with other devices. The pairing management module 405 may also perform other types of pairing to couple the communications device 130 to other devices without departing from the scope and the substance of the inventive concepts herein. In embodiments, the pairing management module 405 may facilitate pairing with one or more of the emitter 120 and/or the receiver 125.

The user interface module 410 may facilitate user interaction with the communications device 130. In some embodiments, the user interface module 410 may configure a display of the communications device 130 to provide one or more user interface elements with which a player can interact. The user interface module 410 may further provide scenes, views, perspectives, and other attributes of gameplay to a user. The user interface module 410 may also facilitate user input to the communications device 130. The user interface module 410 may include video processing hardware and/or software, in various embodiments.

The emitter interface module 415 may facilitate interfacing with the emitter 120. In various embodiments, the emitter interface module 415 may receive and/or provide data to the emitter 120. The receiver interface module 420 may facilitate interfacing with the receiver 125. In various embodiments, the receiver interface module 420 may receive and/or provide data to the receiver 125.

The gameplay cloud interface module 425 may facilitate coupling the communications device 130 to the gameplay system 115. In various embodiments, the gameplay cloud interface module 425 may receive and/or provide data to the gameplay system 115. The gameplay cloud interface module 425 may, in various embodiments, provide player information (e.g., player information related to the emitter 120) to the gameplay system 115. The gameplay cloud interface module 425 may incorporate network interface hardware and/or software to facilitate interfacing with the network 110.

Figure 5:
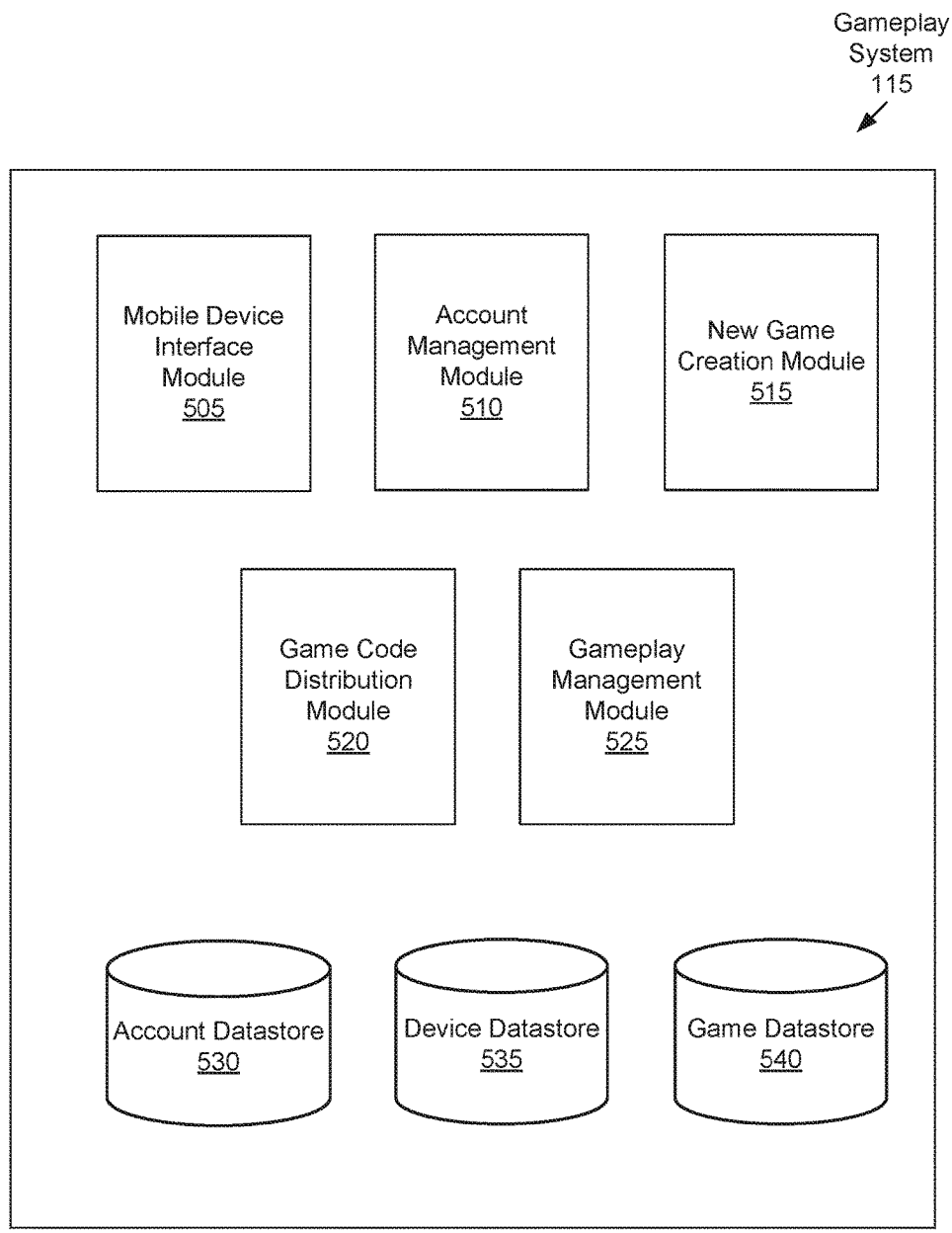
FIG. 5 depicts an example of a gameplay server, according to some embodiments.

FIG. 5 shows an example of a gameplay system 115, according to some embodiments. The gameplay system 115 may include a mobile device interface module 505, an account management module 510, a new game creation module 515, a game code distribution module 520, a gameplay management module 525, an account datastore 530, a device datastore 535, and a game datastore 540. One or more of the mobile device interface module 505, the account management module 510, the new game creation module 515, the game code distribution module 520, the gameplay management module 525, the account datastore 530, the device datastore 535, and the game datastore 540 may include hardware and/or software. One or more of the mobile device interface module 505, the account management module 510, the new game creation module 515, the game code distribution module 520, the gameplay management module 525, the account datastore 530, the device datastore 535, and the game datastore 540 may be coupled to one another or to components external to the gameplay system 115.

The mobile device interface module 505 may facilitate coupling the gameplay system 115 to the communications device 130. In various embodiments, the mobile device interface module 505 may receive and/or provide data to the communications device 130. The mobile device interface module 505 may incorporate network interface hardware and/or software to facilitate interfacing with the network 110.

The account management module 510 may manage accounts for players of sensor-based mobile gameplay. The account management module 510 may manage information such as players' points, usernames, and levels. The account management module 510 may also manage players' relationships with each other. For example, the account management module 510 may manage actions specific players have taken with respect to other players. In various embodiments, the account management module 510 may manage player accounts based on information about players stored in the account datastore 530. The account management module 510 may also manage player accounts based on information about devices stored in the device datastore 535.

The new game creation module 515 may facilitate creation of new games. In various embodiments, the new game creation module 515 may receive instructions to create a new game from a player. The instructions may include identifiers of all players who are invited to play the game. In response to the instructions, the new game creation module 515 may obtain a game instance from the game datastore 540, and place the game instance into memory of the gameplay system 115. The new game creation module 515 may further associate the instance of the game with the identifiers of the players invited to play the game. In various embodiments, the new game creation module 515 may create a game code for the instance of the new game. The new game creation module 515 may provide the game code to the game code distribution module 520.

The game code distribution module 520 may distribute the game code to all players who have been invited to play the instance of the new game. The game code distribution module 520 may receive from the new game creation module 515 a game code for a new game. In various embodiments, the game code distribution module 520 may further obtain, from the account management module 510 or otherwise, contact information of each of the players who were invited to play the game. The game code distribution module 520 may provide the game code for a new game to the contact information of each of the players who were invited to play the game.

The gameplay management module 525 may manage aspects of gameplay related to a new or existing game. In various embodiments, the gameplay management module 525 may identify actions one player has taken with respect to another player. For example, the gameplay management module 525 may identify whether a receiver of a second player has registered an in-game action from an emitter of a first player. The gameplay management module 525 may also identify movements or evasive actions on the part of the second player. In some embodiments, the gameplay management module 525 may associate points with specific actions by players of the game. The gameplay management module 525 may also manage lives, levels, and coordinate group gameplay between players of the game. In some embodiments, the gameplay management module 525 may manage a storyline underlying the gameplay. For example, in a first-person shooting game, the gameplay management module 525 may manage a storyline associated with players entering into combat with one another. In various embodiments, the gameplay management module 525 may support messaging between players. In embodiments, the gameplay management module 525 may further render scenes, views, perspectives, and other attributes of gameplay on the user interface module 410, shown in FIG. 4.

The account datastore 530 may store information related to player accounts. The account datastore 530 may store information such as players' points, usernames, and players' relationships with each other, actions specific players have taken with respect to other players, and other information. The device datastore 535 may store devices that have participated in gameplay. The game datastore 540 may store game instances. In various embodiments, game instances are implemented as data structures in the game datastore 540 that can be instantiated and placed into memory by the new game creation module 515.

Figure 6:
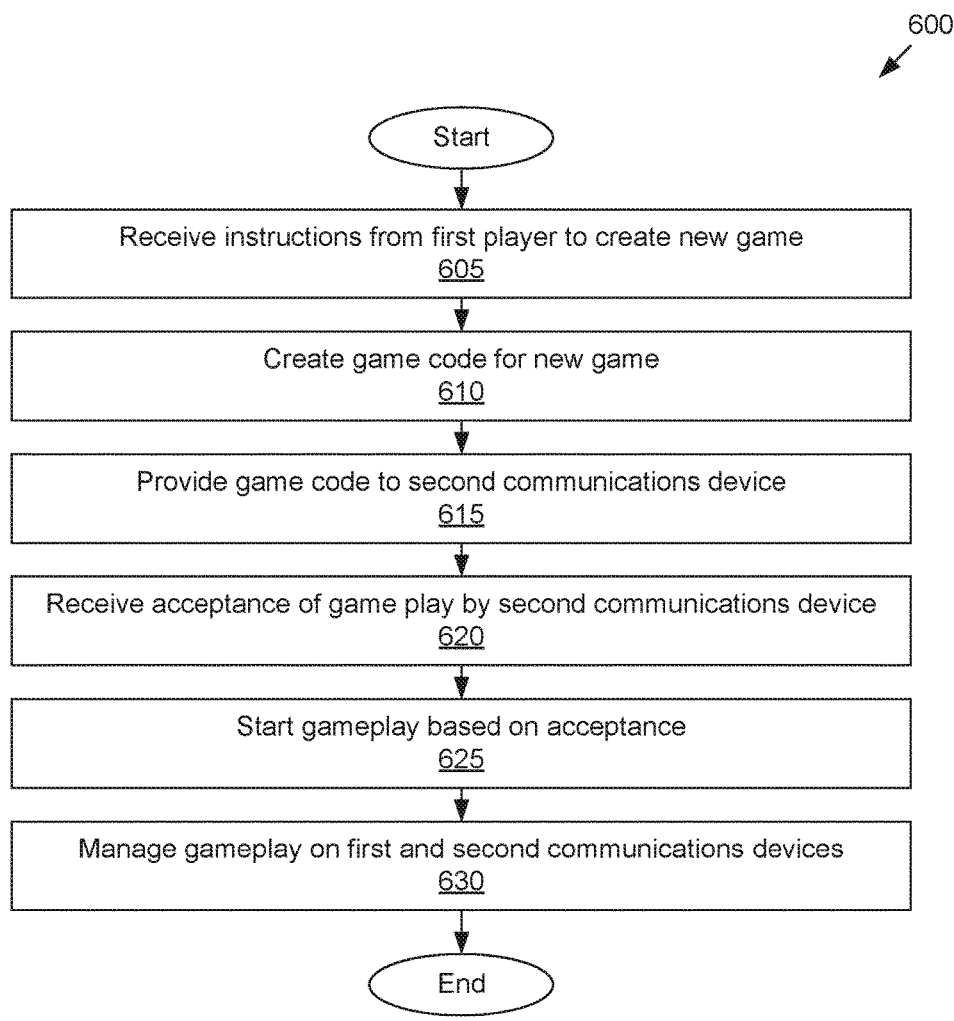
FIG. 6 depicts a flowchart of an example of a method for creating a sensor-based mobile game, according to some embodiments.

FIG. 6 depicts a flowchart 600 of an example of a method for creating a sensor-based mobile game, according to some embodiments. The flowchart 600 is discussed in conjunction with the gameplay system 115, shown in FIG. 5. It is noted the flowchart 600 may have fewer or different steps than the steps illustrated in FIG. 6.

At step 605, the mobile device interface module 505 receives instructions from a first player to create a new game. In various embodiments, the mobile device interface module 505 may receive instructions from the first communications device 130-1 (shown in FIG. 1) to create a new game. The new game may comprise an instance of a game in the game datastore 540. The instructions may include, in some embodiments, an identifier of the game and identifiers of other players invited to play the game. For example, the instructions may include the identifier of an action game or a fantasy game the first player wishes to instantiate.

At step 610, the new game creation module 515 creates a game code for the new game. In some embodiments, the instructions from the first player to create the new game may be provided from the mobile device interface module 505 to the new game creation module 515. The new game creation module 515 may load the instance of the new game into the memory of the gameplay system 115. The new game creation module 515 may create a game code for the instance of the new game. The game code may, in various embodiments, comprise an alphanumeric character string to identify the instance of the new game. The new game creation module 515 may provide the game code to the game code distribution module 520.

At step 615, the game code distribution module 520 instructs the mobile device interface module 505 to provide the game code to a second communications device. More specifically, the game code distribution module 520 may identify particular communications devices (e.g., the Nth communications device 130-N shown in FIG. 1) to participate in the game. The game code distribution module 520 may further configure the mobile device interface module 505 to provide the game code to the Nth communications device 130-1.

At step 620, the mobile device interface module 505 receives acceptance of gameplay by the second communications device. In various embodiments, the mobile device interface module 505 may receive a validation of the game code by the Nth communications device 130-1. The validation may include accepting terms and conditions of gameplay. The validation may also include a device identifier and/or other information related to the identity of the Nth communications device 130-1 and/or the player of the Nth communications device 130-1.

At step 625, the gameplay management module 525 starts gameplay based on the acceptance. At step 630, the gameplay management module 525 manages gameplay on the first and second communications devices. The gameplay management module 525 may instruct the mobile device interface module 505 to provide gameplay data to the first communications device 130-1 and/or the Nth communications device 130-N. The gameplay management module 525 may obtain inputs related to actions from the first communications device 130-1 and/or the Nth communications device 130-N related to gameplay. The actions may relate to actions of the first emitter 120-1, the first receiver 125-1, the Nth emitter 120-N, and/or the Nth receiver 125-N. The first communications device 130-1 and/or the Nth communications device 130-N may further maintain and/or modify states of gameplay based on inputs from the first communications device 130-1 and/or the Nth communications device 130-N.

Figure 7:
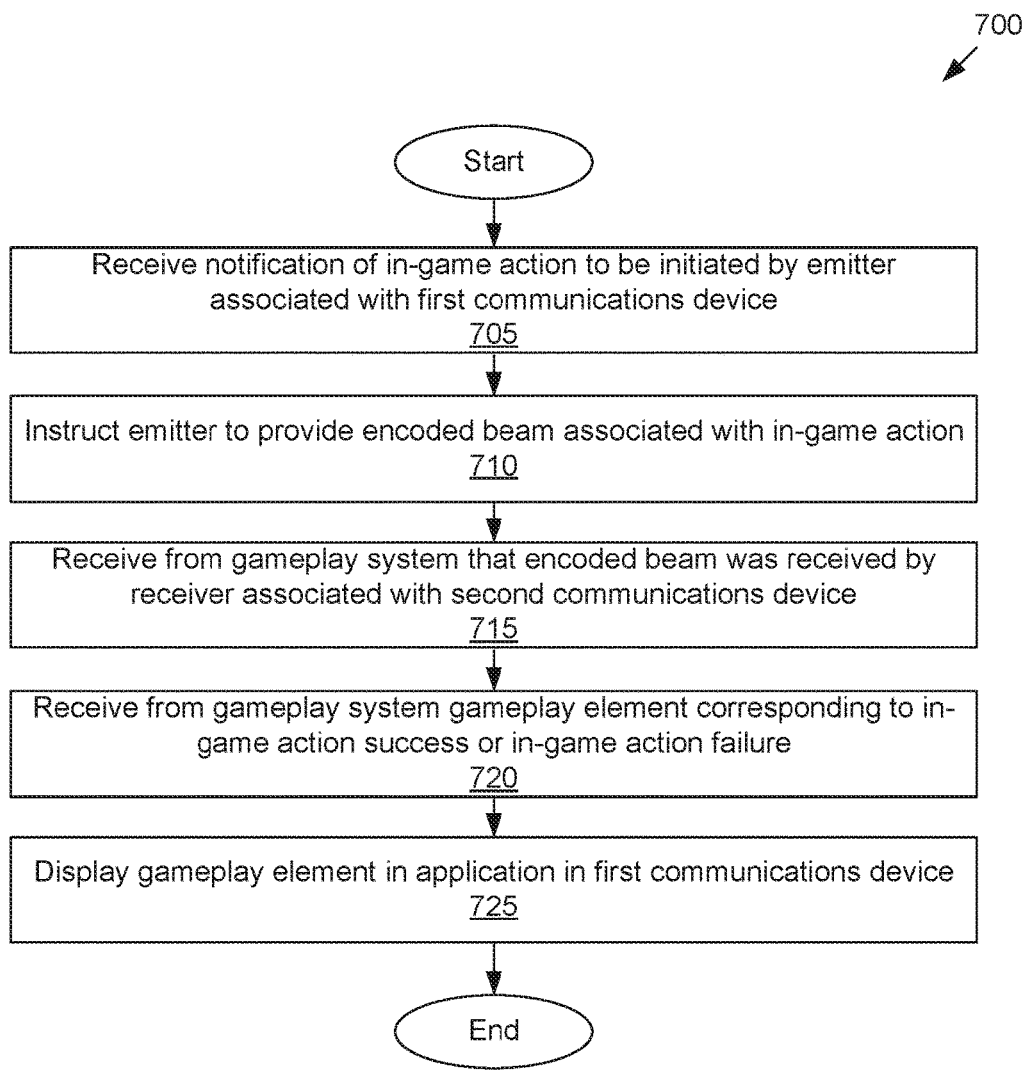
FIG. 7 depicts a flowchart of an example of a method for providing an in-game action in a sensor-based mobile game, according to some embodiments.

FIG. 7 depicts a flowchart 700 of an example of a method for providing an in-game action in a sensor-based mobile game, according to some embodiments. The flowchart 700 is discussed in conjunction with the first communications device 130-1, initially shown in FIG. 1, components of which are further illustrated in the context of the communications device 130 in FIG. 4. It is noted the flowchart 700 may have fewer or different steps than the steps illustrated in FIG. 7.

At step 705, the emitter interface module 415 receives a notification of an in-game action to be initiated by the emitter 120-1, which is associated with the first communications device 130-1. In some embodiments, the notification may be related to a change in state of the shoot mechanism 210 of the emitter 120-1. For example, the notification may be related to: the first player attempting to pull a finger-based trigger, the first player attempting to pull a clip, or the first player attempting to swing the emitter 120-1 at a particular object.

At step 710, the emitter interface module 415 instructs the first emitter 120-1 to provide an encoded beam associated with the in-game action. In various embodiments, the emitter interface module 415 may instruct the first emitter 120-1 to provide an infrared, NFC signal, or other beam in accordance with the in-game action. For instance, the emitter interface module 415 may instruct the first emitter 120-1 to provide an infrared beam in response to the pulling of a finger-trigger. The emitter interface module 415 may, in embodiments, instruct the first emitter 120-1 to provide multiple infrared beams in response to the pulling of a grenade clip. The emitter interface module 415 may further instruct the first emitter 120-1 to provide an NFC signal in response to the swinging of the emitter 120-1, were the first emitter 120-1 configured to act as sword. In various embodiments, the gameplay cloud interface module 425 provides information related to the encoded beam to the gameplay system 115. The gameplay cloud interface module 425 may provide relevant data that the finger-trigger or the clip has been pulled, or that the first emitter 120-1 has been swung, for instance.

At step 715, the gameplay cloud interface module 425 receives from the gameplay system 115 that the encoded beam was received by the Nth receiver 125-N, which is associated with the Nth communications device 130-N. In embodiments, the Short-Range infrared transmitter 220 or the Long-Range infrared Transmitter 225, or a relevant NFC chip, may have provided a beam toward the Nth receiver 125-N. If the beam were properly received by the Nth receiver 125-N, the Nth receiver may have decoded the beam and provided information related to the in-game action to the gameplay system 115. The gameplay system 115 may in turn provide to the gameplay cloud interface module 425 that the encoded beam was received by the Nth receiver 125-N.

At step 720, the gameplay cloud interface module 425 receives from the gameplay system 115 a gameplay element corresponding to the in-game action's success or the in-game action's failure. The gameplay system 115 may provide the gameplay cloud interface module 425 a change in level, points, status, characters, lives, or other gameplay state to the gameplay cloud interface module 425. At step 725, the user interface module 410 displays the gameplay element in an application on the first communications device 130-1.

Figure 8:
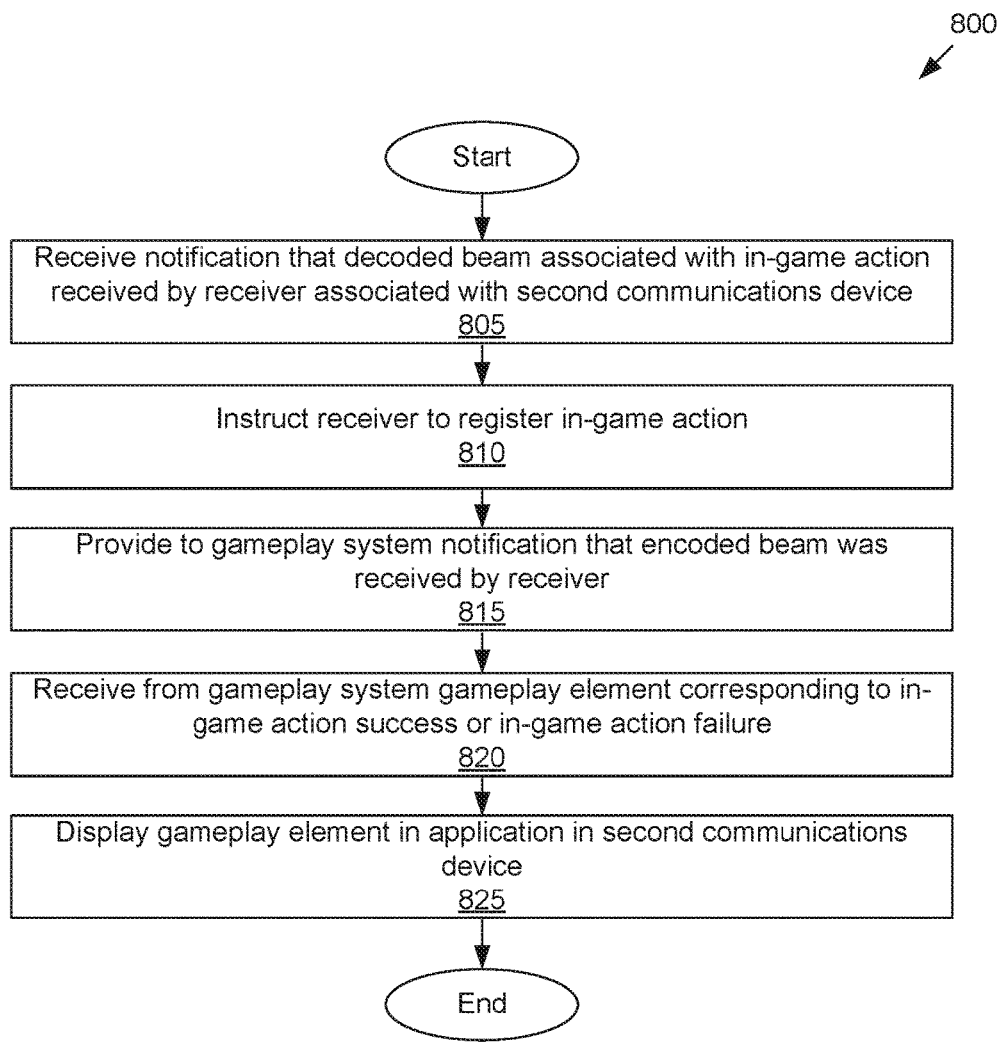
FIG. 8 depicts a flowchart of an example of a method for receiving an in-game action in a sensor-based mobile game, according to some embodiments.

FIG. 8 depicts a flowchart 800 of an example of a method for receiving an in-game action in a sensor-based mobile game, according to some embodiments. The flowchart 800 is discussed in conjunction with the Nth communications device 130-N, initially shown in FIG. 1, components of which are further illustrated in the context of the communications device 130 in FIG. 4. It is noted the flowchart 800 may have fewer or different steps than the steps illustrated in FIG. 8.

At step 805, the receiver interface module 420 receives a notification that a decoded beam associated with an in-game action was received by the Nth receiver 125-N, which is associated with the Nth communications device 130-N. In some embodiments, the notification may be related to whether the infrared receiver 310 of the Nth receiver 125-N received an infrared signal from the first emitter 120-1. The notification may also be related to whether an NFC receiver on the Nth receiver 125-N received an NFC signal from the first emitter 120-1. The beam may have been decoded by the beam decoder 315, as discussed herein.

At step 810, the receiver interface module 420 instructs the Nth receiver 125-N to register the in-game action if the beam was decoded properly. The receiver interface module 420 may further instruct the Nth receiver 125-N to activate one or more of: the vibrator 320, the speaker 325, and the LEDs 330. At step 815, the gameplay cloud interface module 425 provides to the gameplay system 115 a notification that the encoded beam was received by the Nth receiver 125-N. This notification may be provided over the network 110.

At step 820, the gameplay cloud interface module 425 receives from the gameplay system 115 a gameplay element (e.g., the notification) that may correspond to an in-game action's success, an in-game action's failure, or other in-game activity. The gameplay system 115 may provide the gameplay cloud interface module 425 a change in level, points, status, characters, lives, or other gameplay state to the gameplay cloud interface module 425. At step 825, the user interface module 410 displays the gameplay element in an application in the Nth communications device 130-N.

Figure 9:
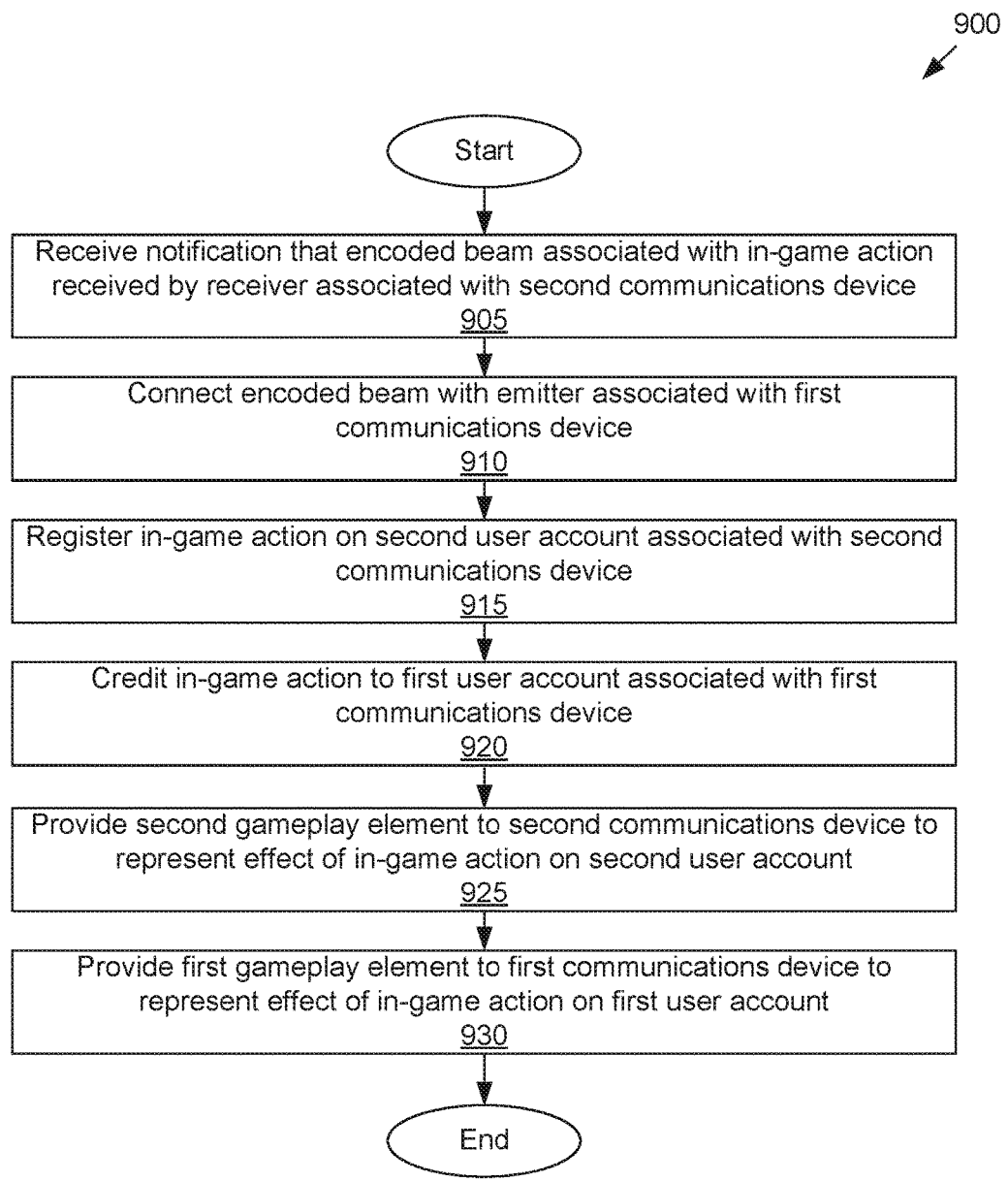
FIG. 9 depicts a flowchart of an example of a method for processing an in-game action in a sensor-based mobile game, according to some embodiments.

FIG. 9 depicts a flowchart 900 of an example of a method for processing an in-game action in a sensor-based mobile game, according to some embodiments. The flowchart 800 is discussed in conjunction with the gameplay system 115, shown in FIG. 5. It is noted the flowchart 900 may have fewer or different steps than the steps illustrated in FIG. 9.

At step 905, the mobile device interface module 505 receives a notification that an encoded beam associated with in-game action was received by the Nth receiver 120-N, which is associated with the Nth communications device 130-N. In various embodiments, the infrared receiver 310, an NFC receiver, or other receiver on the Nth communications device 130-N may indicate an encoded beam was received. The encoded beam may correspond to an in-game action like a change in state of a finger-trigger, the pulling of a clip, or the swinging of an emitter. The beam decoder 315 may decode the encoded beam. The Nth receiver 120-N may have provided the notification that the encoded beam was received to the Nth communications device 130-N. The mobile device interface module 505 may receive from the Nth communications device 130-N the notification about the encoded beam.

At step 910, the gameplay management module 525 connects the encoded beam with the first emitter 120-1, which is associated with first communications device 130-N. Using information, such as device identification information provided to the Nth receiver 125-N in the encoded beam, the gameplay management module 525 may identify the emitter that provided the encoded beam. In some embodiments, the first emitter 120-1 may have provided the encoded beam. Such information may be obtained by the gameplay management module 525.

At step 915, the gameplay management module 525 registers an in-game action on an Nth user account associated with Nth communications device 130-N. In some embodiments, the gameplay management module 525 may determine what type of in-game conduct corresponds to the encoded beam. For example, the gameplay management module 525 may identify whether the encoded beam corresponds to a gun being shot, a grenade being launched, or a sword being swung. The gameplay management module 525 may register, in the game datastore 540, the in-game action(s) corresponding to the identified conduct. In some embodiments, the account management module 510 may also register the in-game action on the Nth user's account in the account datastore 530.

At step 920, the gameplay management module 525 credits the in-game action to a first user account associated with the first communications device 130-1. That is, the gameplay management module 525 may award points, levels, lives, etc., to the player associate with the first communications device 130-1 for the in-game action. In some embodiments, the account management module 510 may also credit the in-game action to a first user account associated with the first communications device 130-1.

At step 925, the mobile device interface module 505 provides a second gameplay element to the Nth communications device 130-N to represent effect of in-game action on the second user account. The Nth communications device 130-N may process and/or display the effect of the in-game action. At step 930, the mobile device interface module 505 provides the first gameplay element to the first communications device 120-1 to represent the effect of the in-game action on first user account. The first communications device 130-1 may process and/or display the effect of the in-game action.

Figure 10:
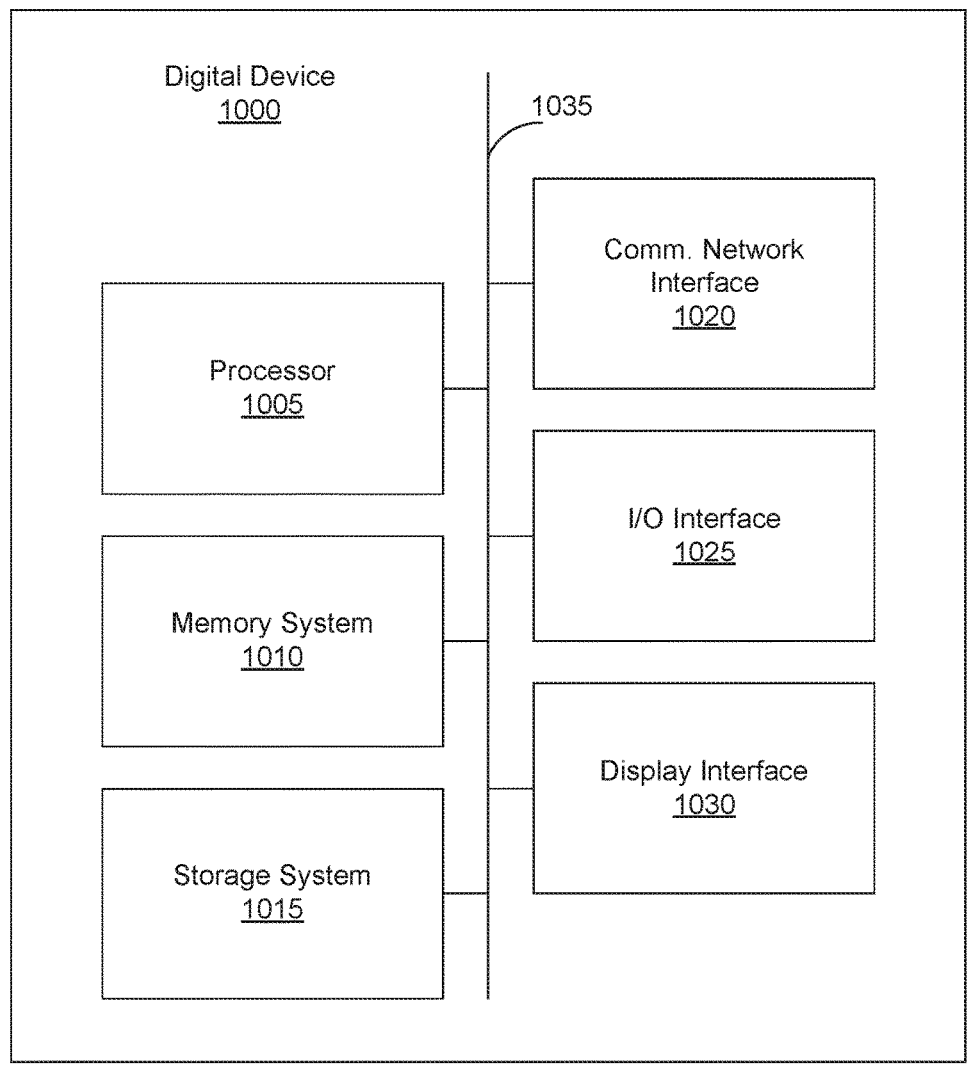
FIG. 10 depicts an example of a digital device, according to some embodiments.

FIG. 10 depicts an example of a digital device 1000, according to some embodiments. The digital device 1000 comprises a processor 1005, a memory system 1010, a storage system 1015, a communication network interface 1020, an Input/output (I/O) interface 1025, a display interface 1030, and a bus 1035. The bus 1035 may be communicatively coupled to the processor 1005, the memory system 1010, the storage system 1015, the communication network interface 1020, the I/O interface 1025, and the display interface 1030.

In some embodiments, the processor 1005 comprises circuitry or any processor capable of processing the executable instructions. The memory system 1010 comprises any memory configured to store data. Some examples of the memory system 1010 are storage devices, such as RAM or ROM. The memory system 1010 may comprise the RAM cache. In various embodiments, data is stored within the memory system 1010. The data within the memory system 1010 may be cleared or ultimately transferred to the storage system 1015.

The storage system 1015 comprises any storage configured to retrieve and store data. Some examples of the storage system 1015 are flash drives, hard drives, optical drives, and/or magnetic tape. In some embodiments, the digital device 1000 includes a memory system 1010 in the form of RAM and a storage system 1015 in the form of flash data. Both the memory system 1010 and the storage system 1015 comprise computer readable media which may store instructions or programs that are executable by a computer processor including the processor 1005.

The communication network interface (com. network interface) 1020 may be coupled to a data network. The communication network interface 1020 may support communication over an Ethernet connection, a serial connection, a parallel connection, or an ATA connection, for example. The communication network interface 1020 may also support wireless communication (e.g., 802.10a/b/g/n, WiMAX, LTE, 3G, 2G). It will be apparent to those skilled in the art that the communication network interface 1020 may support many wired and wireless standards.

The optional input/output (I/O) interface 1025 is any device that receives input from the user and output data. The display interface 1030 is any device that may be configured to output graphics and data to a display. In one example, the display interface 1030 is a graphics adapter.

It will be appreciated by those skilled in the art that the hardware elements of the digital device 1000 are not limited to those depicted in FIG. 10. A digital device 1000 may comprise more or less hardware elements than those depicted. Further, hardware elements may share functionality and still be within various embodiments described herein. In one example, encoding and/or decoding may be performed by the processor 1005 and/or a co-processor located on a GPU.

Figure 11A:
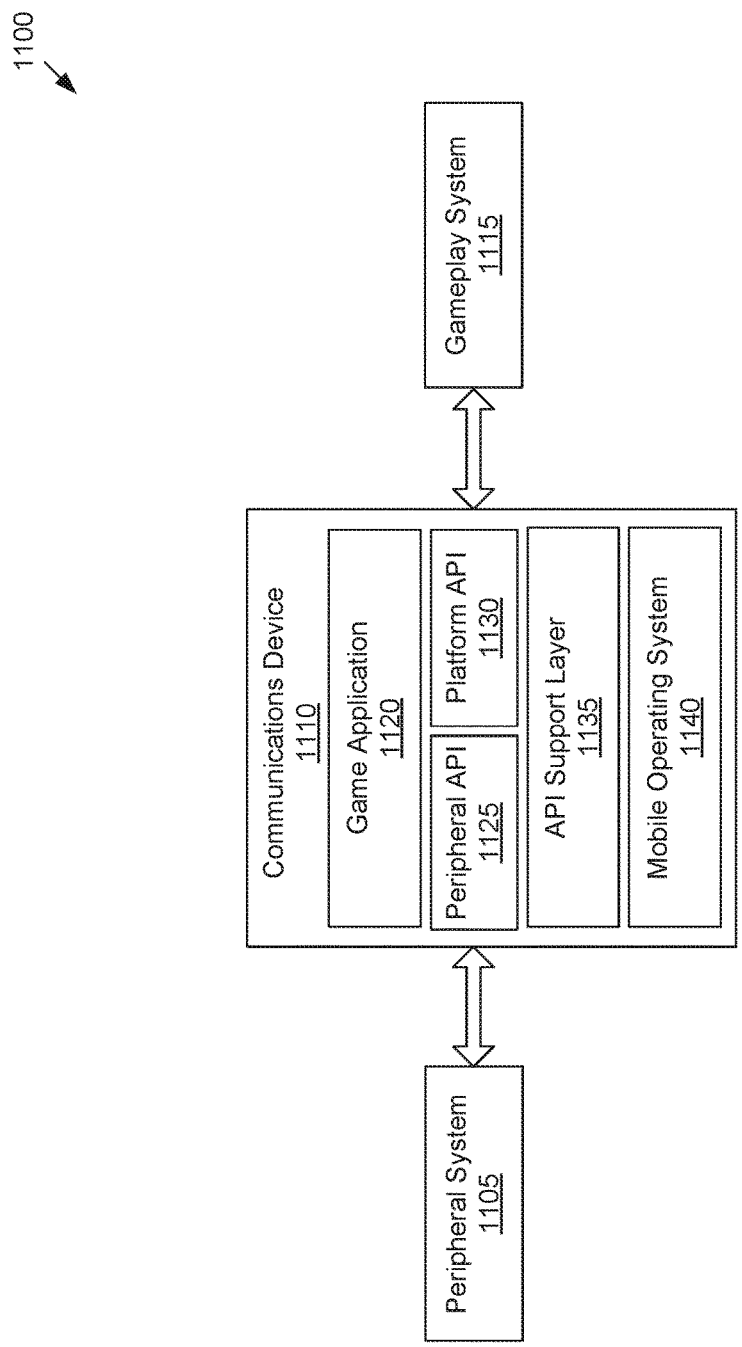
FIG. 11A depicts an example of a sensor-based mobile gaming system, according to some embodiments.

FIG. 11A depicts an example of a sensor-based mobile gaming system 1100, according to some embodiments. The sensor-based mobile gaming system 1100 may include a peripheral system 1105, a communications device 1110, and a gameplay system 1115.

The peripheral system 1105 may include any peripheral system, such as a receiver or an emitter, as discussed herein. In some embodiments, the peripheral system 1105 may correspond to one or more of the emitter 120 and/or the receiver 125, shown in FIG. 1. As such, the peripheral system 1105 may include a transmitter, a receiver, a lens, and other hardware to facilitate sensor-based mobile gaming. The peripheral system 1105 may be paired to the communications device 1110, as discussed herein. The peripheral system 1105 may be coupled to the communications device 1110. In some embodiments, the peripheral system 1105 is coupled to the communications device 1110 using a Bluetooth connection or other wireless connection.

The communications device 1110 may include any digital device, an example of which is the digital device 1000 shown in FIG. 10. In various embodiments, the communications device 1110 may correspond to the communications device 130, shown in FIG. 1. In some embodiments, the communications device 1110 may include a game application 1120, a peripheral API 1125, a platform API 1130, an API support layer 1135, and a mobile operating system 1140.

In various embodiments, the game application 1120 may allow a user to engage in sensor-based mobile gaming as discussed herein. More specifically, the game application 1120 may include gameplay modules to facilitate sensor-based mobile gaming. In various embodiments, the game application 1120 may include modules corresponding to one or more of the user interface module 410 and the gameplay memory datastore 430, shown in FIG. 4. The game application 1120 may be implemented in any convenient format, including, in various embodiments, an iOS® mobile application or an Android® mobile application.

The peripheral API 1125 may support coupling the communications device 1110 to the peripheral system 1105. In some embodiments, the peripheral API 1125 is implemented as a Bluetooth or other wireless interface to the peripheral system 1105. In various embodiments, the peripheral API 1125 may correspond to some or all of the emitter interface module 415 and the receiver interface module 420, shown in FIG. 4. The platform API 1130 may support coupling the communications device 1110 to the gameplay system 1115. The platform API 1130 may be implemented as a bus, a network interface, or other interface. In various embodiments, the platform API 1130 may correspond to some or all of the gameplay cloud interface module 425, shown in FIG. 4.

The API support layer 1135 may support function calls used by the game application 1120, the peripheral API 1125, and the platform API 1130. In some embodiments, the API support layer 1135 may facilitate receiving and processing user interface inputs, such as gestures, swipes, and clicks. In an implementation, the API support layer 1135 comprises a Cocoa Touch® layer. It is noted the API support layer 1135 may also comprise Android API support layer(s) or other support layer(s) without departing from the scope and substance of the inventive concepts described herein. The mobile operating system 1140 may comprise an operating system of the communications device 1110. In various embodiments, the mobile operating system 1140 may comprise an iOS® operating system or Android® operating system. It is noted the mobile operating system 1140 may comprise other forms of operating systems in some embodiments.

The gameplay system 1115 may support sensor-based gaming by a user of the communications device 1110, as discussed herein. In some embodiments, the gameplay system 1115 may be coupled to the communications device 1110 using a network connection, such as an Internet connection. The network connection may comprise a wireless network connection. The gameplay system 1115 may also be coupled to the communications device 1110 over other convenient connections as known in the art. In various embodiments, the gameplay system 1115 may correspond to some or all of the gameplay system 115, shown in FIG. 1.

Figure 11B:
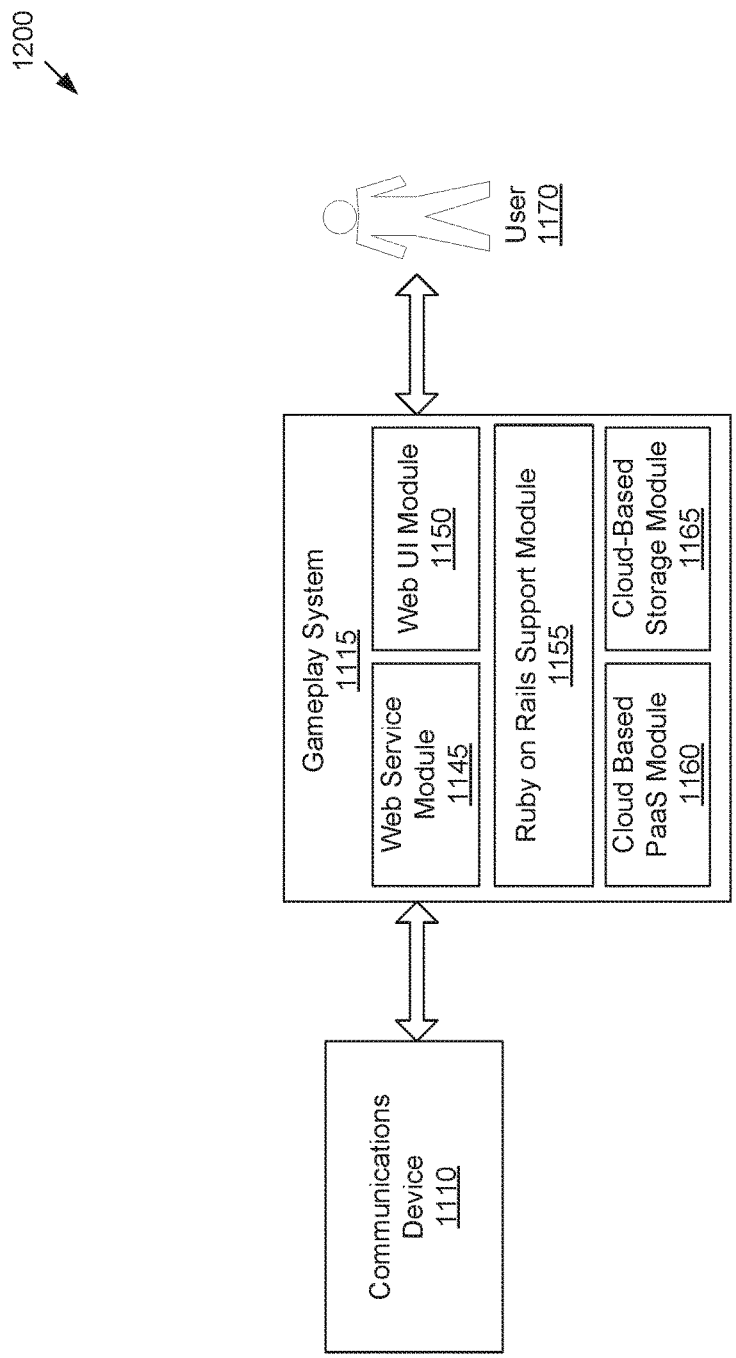
FIG. 11B depicts an example of a sensor-based mobile gaming system, according to some embodiments.

FIG. 11B depicts an example of a sensor-based mobile gaming system 1100, according to some embodiments. The sensor-based mobile gaming system 1100 may include a communications device 1110, a gameplay system 1115, and a user 1170.

The communications device 1110 may be coupled to the gameplay system 1115. The communications device 1110 may correspond to the communications device 1110 in FIG. 11A.

The gameplay system 1115 may correspond to the gameplay system 1115 in FIG. 11A. The gameplay system 1115 may include a web service module 1145, a web UI module 1150, a Ruby on Rails support module 1155, a cloud-based Platform as a Service (PaaS) module 1160, and a cloud-based storage module 1165. In some embodiments, the web service module 1145 may be coupled to the communications device 1110. The web service module 1145 may provide sensor-based mobile gaming services, as described herein, as a web service to the communications device 1110. The web UI module 1150 may be coupled to the user 1170. The web UI module 1150 may provide an online portal to access an account associated with the user 1170. The Ruby on Rails support module 1155 may allow the web service module 1145 and the web UI module 1150 to access the cloud-based PaaS module 1160 and the cloud-based storage module 1165. The cloud-based PaaS module 1160 may provide PaaS to other modules. The cloud-based storage module 1165 may provide cloud-based storage to the other modules. In some embodiments, the gameplay system 1115 may correspond to some or all of the gameplay system 115, shown in FIG. 1.

The user 1170 may be any player that utilizes the system. The user 1170 may represent a player seeking to access a web portal associated with sensor-based mobile gaming, as discussed herein. The user 1170 may correspond to the player of the first communications device 130-1 or the Nth communications device 130-N, shown in FIG. 1.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some embodiments", "various embodiments", "certain embodiments", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A system comprising:
   an emitter having a first physical form corresponding to a first physical object used in sensor-based augmented-reality gameplay related to a specific augmented-reality game, the emitter configured to emit an emitter signal, the emitter being controlled by a first player, the emitter signal including emitter identification information;
   a receiver having a second physical form corresponding to a second physical object used in the sensor-based augmented-reality gameplay, the receiver configured to receive the emitter signal and generate a receiver signal, the receiver signal including the emitter identification information; and
   a smartphone comprising:
      a gameplay cloud interface module configured to:
         provide a previously generated game code to a wireless remote server to initiate the sensor-based augmented-reality gameplay of the specific augmented-reality game, the previously generated game code being previously generated by the wireless remote server in response to instructions from the first player to create an instance of the specific augmented-reality game;
         receive the receiver signal and communicate an indication to the wireless remote server, in response to the receiver signal, the indication including first player identification information associated with an in-game action taken in the specific augmented-reality game, the first player identification information being based at least in part on the emitter identification information; and
         receive a change in gameplay state generated by the wireless remote server, the wireless remote server having determined a change in score based on the indication associated with the receiver signal and the emitter identification information provided by the emitter controlled by the first player to generate the change in gameplay state; and
      a user interface module configured to present gameplay information based on the change in gameplay state to the first player, the gameplay information being related to the sensor-based augmented-reality gameplay related to the specific augmented-reality game.

2. The system of claim 1, wherein the emitter identification information comprises the first player identification information.

3. The system of claim 1, wherein the receiver is controlled by a second player.

4. The system of claim 1, wherein the smartphone further comprises a pairing module configured to pair the smartphone to one or more of the emitter and the receiver.

5. The system of claim 1, wherein the emitter and receiver are incorporated into a modular peripheral device.

6. The system of claim 1, wherein the emitter is incorporated into one or more of a gun, a sword, a grenade, a bow, and a wand.

7. The system of claim 1, wherein the emitter signal comprises one or more of an infrared signal and a Near Field Communications (NFC) signal.

8. The system of claim 1, wherein the gameplay cloud interface module supports an Internet connection to the wireless remote server.

9. The system of claim 1, wherein the emitter identification information is different in subsequent signals generated by the emitter.

10. A method comprising:
    providing, from a smartphone, a previously generated game code to a wireless remote server to initiate sensor-based augmented-reality gameplay of a specific augmented-reality game, the previously generated game code being previously generated by the wireless remote server in response to instructions from a first player to create an instance of the specific augmented-reality game;
    emitting an emitter signal from an emitter having a first physical form corresponding to a first physical object used in sensor-based augmented-reality gameplay related to the specific augmented-reality game, the emitter being controlled by the first player, the emitter signal including emitter identification information;
    receiving the emitter signal with a receiver having a second physical form corresponding to a second physical object used in the sensor-based augmented-reality gameplay;
    generating a receiver signal by the receiver, the receiver signal including the emitter identification information;
    receiving, by the smartphone, the receiver signal;
    communicating, by the smartphone, an indication to the wireless remote server in response to the receiver signal, the indication including first player identification information associated with an in-game action taken in the specific augmented-reality game, the first player identification information being based at least in part on the emitter identification information;
    receiving, by the smartphone, a change in gameplay state generated by the wireless remote server, the wireless remote server having determined a change in score based on the indication associated with the receiver signal and the emitter identification information provided by the emitter controlled by the first player to generate the change in gameplay state; and
    presenting, by the smartphone, gameplay information based on the change in gameplay state to the first player, the gameplay information being related to the sensor-based augmented-reality gameplay related to the specific augmented-reality game.

11. The method of claim 10, wherein the emitter identification information comprises the first player identification information.

12. The method of claim 10, wherein the receiver is controlled by a second player.

13. The method of claim 10, further comprising pairing the smartphone to one or more of the emitter and the receiver.

14. The method of claim 10, wherein the emitter and the receiver are incorporated into a modular peripheral device.

15. The method of claim 10, wherein the emitter is incorporated into one or more of a gun, a sword, a grenade, a bow, and a wand.

16. The method of claim 10, wherein the emitter signal comprises one or more of an infrared signal and a Near Field Communications (NFC) signal.

17. The method of claim 10, wherein the smartphone supports an Internet connection to the wireless remote server.

18. The method of claim 10, wherein the emitter identification information is different in subsequent signals generated by the emitter.

19. The method of claim 10, wherein the gameplay information comprises one or more of a gameplay level, gameplay points, and a gameplay life of the first player.

20. A system comprising:
- means for emitting an emitter signal having a first physical form corresponding to a first physical object used in sensor-based augmented-reality gameplay related to a specific augmented-reality game, the means for emitting the emitter signal being controlled by a first player, the emitter signal including emitter identification information;
- means for receiving the emitter signal and for generating a receiver signal, the means for receiving the emitter signal and for generating the receiver signal having a second physical form corresponding to a second physical object used in the sensor-based augmented-reality gameplay, the receiver signal including the emitter identification information; and
- a smartphone configured to:
  - provide a previously generated game code to a wireless remote server to initiate sensor-based augmented-reality gameplay of the specific augmented-reality game, the previously generated game code being previously generated by the wireless remote server in response to instructions from the first player to create an instance of the specific augmented-reality game;
  - receive the receiver signal,
  - communicate an indication to the wireless remote server, in response to the receiver signal, the indication including first player identification information with an in-game action taken in the specific augmented-reality game, the first player identification information being based at least in part on the emitter identification information,
  - receive a change in gameplay state generated by the wireless remote server, the wireless remote server having determined a change in score based on the indication associated with the receiver signal and the emitter identification information provided by the emitter controlled by the first player to generate the change in gameplay state; and
- present gameplay information based on the change in gameplay state to the first player, the gameplay information being related to the sensor-based augmented-reality gameplay related to the specific augmented-reality game.

* * * * *